United States Patent [19]

Salzer et al.

[11] Patent Number: 4,954,708

[45] Date of Patent: Sep. 4, 1990

[54] LOW DISTORTION FOCAL PLANE PLATFORM

[75] Inventors: Donald E. Salzer, Santa Barbara; Nevil Q. Maassen, Goleta, both of Calif.

[73] Assignee: Santa Barbara Research Center, Goleta, Calif.

[21] Appl. No.: 397,808

[22] Filed: Aug. 23, 1989

[51] Int. Cl.⁵ .............................................. G01J 5/06
[52] U.S. Cl. ..................................... 250/352; 62/51.1
[58] Field of Search ........................... 250/352, 370.15; 62/51.1, 51.2

[56] References Cited

U.S. PATENT DOCUMENTS 4,190,106  2/1980  Dunmire et al. .................... 250/352

Primary Examiner—Carolyn E. Fields
Attorney, Agent, or Firm—W. C. Schubert; W. K. Denson-Low

[57] ABSTRACT

An infrared detector assembly (12) of the type used in munitions and night vision systems having an improved focal plane platform (10). The focal plane platform (10) includes an end-cap (32) made from tungsten. Adhesively bonded to end-cap (32) is a ceramic mounting board (34). Ceramic mounting board (34) further comprises gold trace pattern (50) for conducting electrical signals generated by hybrid detector (26) to external control electronics. The improved focal plane platform (10) provides a relatively distortion free, thermally stable mounting platform upon which detector (26) is secured. Premature thermal fatigue failure of the hybrid detector is thereby inhibited.

20 Claims, 2 Drawing Sheets

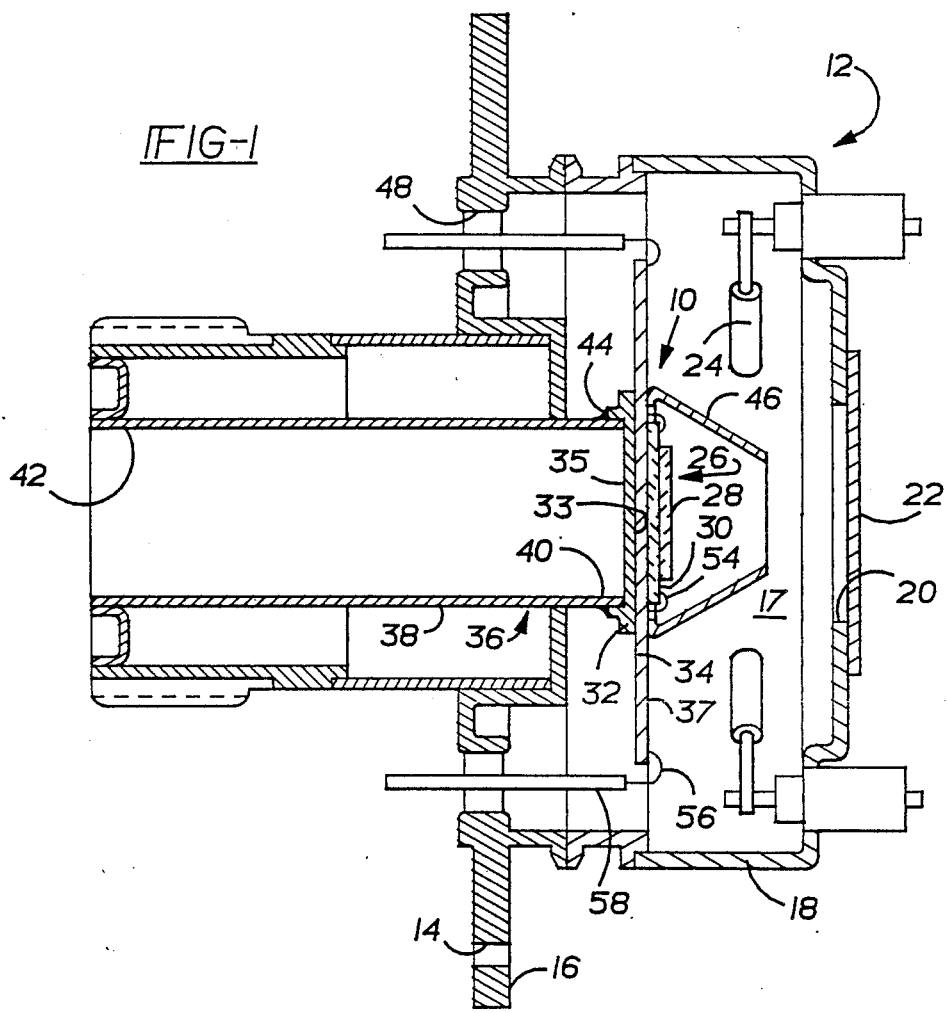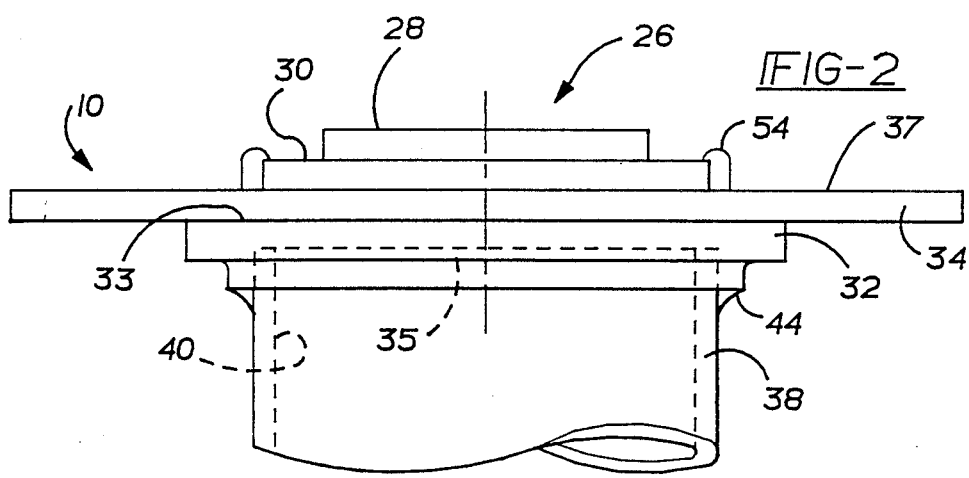

LOW DISTORTION FOCAL PLANE PLATFORM

BACKGROUND OF THE INVENTION

1. Field of the Invention

This invention relates to an improved infrared seeker assembly, and more particularly to one having an improved focal plane platform construction.

2. Discussion

Infrared detection systems are often used in conjunction with munitions and night vision systems for sensing electromagnetic radiation in the wavelength range of one to fifteen micrometers. Because many such detection systems have detector arrays which are most sensitive when operated at about 80° K., a cooling system is required to produce and maintain the required low operating temperatures. Typically, such cooling systems either take the form of a cryostat utilizing the Joule-Thompson effect, or a Stirling cycle cryoengine. The cooling systems are used in conjunction with an evacuated dewar in which the electromagnetic detector is placed. The dewar is evacuated to remove thermally conductive gases which would otherwise occupy the area surrounding the detector so that potential heat loss through convection and conduction is minimized. The evacuated dewar also prevents moisture from condensing on the detector. The dewar is cooled by placing an indented region ("coldwell") of the dewar in contact with an expansion chamber ("expander") of the cryogenic cooling system. Commonly, the expander has a cylindrical tube ("coldfinger") having an end which is cooled and which supports a focal plane platform upon which the detector and related components are mounted. Alternately, the dewar can be constructed without a coldfinger such that the detector is mechanically supported directly by the focal plane platform. The cooling system produces cyclical cooling by sequential compression of a working fluid such as helium, removal of the heat generated during compression of the working fluid, and subsequent expansion of the working fluid. Thermal energy is withdrawn from the detector through the focal plane platform which is in thermally conductive communication with the cooling system. Since the cooling system is in thermal communication with the focal plane platform, expansion of the working fluid within the coldwell causes thermal energy to be withdrawn from the detector.

In order to produce efficient conductive withdrawal of thermal energy from an electromagnetic detector, the focal plane platform on which the detector is mounted must be fabricated from a material, or composition of materials, possessing specific metallurgical properties. Ideally, these properties include high strength, a high modulus of elasticity and high thermal conductivity. Additionally, the focal plane platform must produce low thermal distortion characteristics to minimize premature detector failures.

A number of design constraints affect the design of the focal plane platform. Since the focal plane platform is a structural support member, it must have sufficient bending stiffness to minimize mechanical deflection of the electromagnetic detector. Such requirements become particularly significant when the infrared seeker assembly is used as part of munitions subjected to intense vibration and high levels of boost-phase acceleration. Another significant design parameter is the extent to which heat is transferred through the focal plane platform. Another design consideration is the cool-down rate for the cold end components of the infrared seeker assembly. Since infrared seekers are often used in expendable munitions which must acquire a target soon after (or before) their launch, cool-down time becomes a critical consideration for some applications.

Prior art focal plane platforms have been fabricated from various materials. Titanium, copper and beryllium have been used, but unfortunately do not yield low thermal distortion characteristics under thermal cycling conditions. While other commercially available materials continue to be evaluated, none provide a coefficient of expansion substantially similar to that of typical hybrid detectors which is crucial to minimizing thermal distortion.

SUMMARY OF THE INVENTION

A detector assembly of the type used in munitions and night vision systems having an improved focal plane platform is disclosed. The focal plane platform supports a detector within an evacuated cavity of the detector assembly and comprises an end-cap made from tungsten and a ceramic mounting board secured to the end-cap. The improved focal plane platform provides a relatively distortion free, thermally stable mounting platform upon which the detector is secured. Premature thermal fatigue failure of the hybrid detector is thereby inhibited.

BRIEF DESCRIPTION OF THE DRAWINGS

Various advantages of the present invention will become apparent to one skilled in the art upon reading the following specification and references to the drawings in which:

FIG. 1 is a cross-sectional view of an infrared seeker assembly equipped with an improved focal plane platform illustrating the operational association of the components.

FIG. 2 is a side-view of an improved focal plane platform in accordance with this invention.

DETAILED DESCRIPTION OF THE PREFERRED EMBODIMENTS

Figure 3:
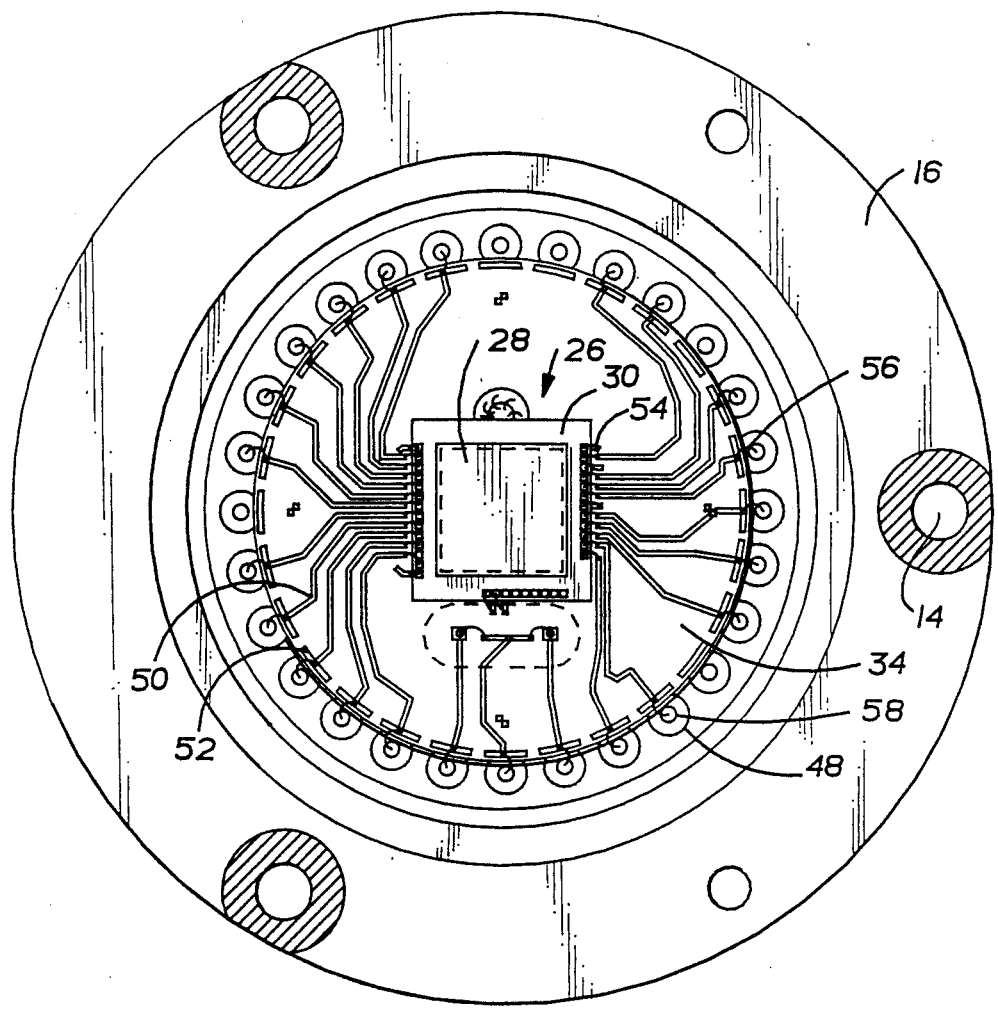
FIG. 3 is a top view of FIG. 1 with the dewar housing removed illustrating the electrical interconnection of the components.

The material of choice for end-cap fabrication is pure tungsten. Tungsten has a thermal coefficient of expansion which closely parallels that of commonly fabricated hybrid detectors operating at cryogenic temperatures. This provides for a relatively distortion-free detector mounting platform. Resistance to thermal distortion is critical to inhibit premature contact bump failure of hybrid detectors during thermal cycling.

Inferior focal plane platform materials produce unacceptable detector life and reliability results under cyclic cryogenic temperature conditions. Such materials hinder the efficient flow of thermal energy from the infrared detector into the coldwell thereby mandating utilization of a cryoengine assembly having a greater cooling capacity than would otherwise be necessary. Even worse, previously utilized focal plane platform materials produce an excessively high rate of hybrid detector failure during thermal cycling. Specifically, excessive thermal distortion of the focal plane platform causes delamination ("bowing") of sensitive detector contacts and surfaces.

The combination of a tungsten end-cap and a ceramic mounting board, adhesively bonded together, produces a focal plane platform construction providing superior thermal stability and conductivity characteristics during cyclical operation of a cryogenic cooling system. The tungsten end-cap, in and of itself, provides an improved focal platform. However, the bonding of a ceramic mounting board to the tungsten end-cap provides a substantially "stress free" surface upon which the hybrid detector is mounted. The ceramic mounting board augments the distortion resistance provided by the tungsten end-cap.

With reference to the drawings, a low distortion focal plane platform 10 according to the present invention is shown. FIG. 1 illustrates a detector assembly 12, such as an infrared seeker, having focal plane platform 10 assembled therein. Detector assembly 12 is secured to a mounting structure by a plurality of fasteners (not shown) which extend through bore 14 on mounting flange 16. Dewar housing 18 encloses the forward end of detector assembly 12 and has a central aperture 20 covered by infrared window 22. Window 22 is fabricated from germanium or zinc senenide to produce the desired transmission band, and is used to transmit incoming infrared radiation to the detector. Getters 24 are provided to absorb any outgassing which escapes into the interior cavity 17 of housing 18. Detector assembly 12 includes a hybrid detector 26 for receiving infrared radiation and generating responsive electrical signals. Hybrid detector 26 includes a photodetector array 28 electrically interconnected to an integrated circuit readout board 30. Hybrid detector 26 is secured to focal plane platform 10 by a thermally conductive adhesive, which permits thermal energy to flow from hybrid detector 26. Preferably, the adhesive is of a silicone based, room temperature, vulcanizing type having a low glass transition temperature to inhibit thermal stresses.

To provide a low distortion mounting for hybrid detector 26, focal plane platform 10 comprises an end-cap 32 and a ceramic mounting board 34. End-cap 32 is fabricated from tungsten in a disc-shaped configuration so as to have a low thermal mass and relatively high thermal conductivity. Preferably, end-cap 32 is fabricated from commercially pure tungsten. End-cap 32 has first and second surfaces 33 and 35, respectively. Surface 33 is substantially planar. In accordance with the embodiment shown in FIG. 1, surface 35 is configured to enclose and hermetically seal a coldfinger tube described below. Ceramic mounting board 34 has a disc-shaped configuration having a larger cross-section than end-cap 32. Ceramic mounting board 34 provides a relatively stress-free platform upon which hybrid detector 26 is mounted. Ceramic mounting board 34 is fabricated from a polycrystalline sapphire structure known as alumina. Preferably, the alumina is at least about 97% pure. Alumina mounting board 34 is secured to first surface 33 of end-cap 32 by means of a thermally conductive adhesive, such as epoxy, so as to define focal plane platform 10.

To remove thermal energy from hybrid detector 26 so as to permit optimum detector performance, hybrid detector assembly 12 further comprises a coldfinger assembly 36. Coldfinger assembly 36 includes a coldfinger tube 38 which, preferably, is metallurgically bonded (brazed) to second surface 35 of end-cap 32. Coldfinger tube 38 houses the refrigeration mechanism for cooling fluid from a cryogenic cooling system (not shown). By expansion of the fluid inside coldfinger tube 38, thermal energy is withdrawn from focal plane platform 10 thereby cooling hybrid detector 26. Preferably, coldfinger tube 38 is fabricated from a thin-walled right circular titanium tube and which has a cold end 40 and warm end 42 (referring to their temperatures during use). Cold end 40 is enclosed by end-cap 32. A metallurgical bond 44 is provided therebetween to produce a hermetic, thermally stable coldfinger assembly 36. However, it is contemplated that any other suitable material possessing similar thermal characteristics and which can be hermetically joined to focal plane platform 10 may be used.

To minimize the amount of thermal radiation delivered to hybrid detector 26 from sources other than the scene, a coldshield 46 is provided which is centrally located over hybrid detector 26. Coldshield 46 is adhesively secured to alumina mounting board 34 in coaxial relation to detector 26. Coldshield 46 has an aperture which provides an unobstructed path for infrared radiation from the environment to be received by detector 26. Coldshield 46 has a thin wall and is fabricated from a high conductivity material so as to have a relatively low thermal mass which reduces cool-down time. While coldshield 46 may be fabricated from 6061-T6 aluminum, it is to be understood that other suitable materials may be used.

To permit electrical communication between detector 26 and external electronics, wiring associated with detector 26 penetrates mounting flange 16 at feed-through ports 48. Referring now to FIG. 3, means for conducting electrical signals from detector 26 to feed-through ports 48 is illustrated in greater detail. Generally, the surface upon which infrared detector 26 is mounted is "metalized" to provide an electrically conductive communication path. Specifically, a predefined pattern having a plurality of gold traces 50 is vapor deposited on surface 37 of alumina mounting board 34 prior to mounting of detector 26. Gold traces 50 emanate radially from a location relatively near detector 26 to a plurality of positions near the peripheral circumference of mounting board 34. More particularly, gold trace pattern 50 begins at about a $\frac{1}{8}"$ distance from two opposite edges of integrated circuit readout board 30 and culminates at a plurality of conductive pads 52 located along the outer circumference of alumina mounting board 34. Gold traces 50 are attached at one end to integrated circuit readout board 30 through lead wires 54. Lead wires 54 are attached via wire bonding to provide an electrical conduction path which is resistant to thermal and mechanical distortion and oscillation. Conductive pads 52 are also wire bonded via lead wires 56 to feed-through pins 58 which extend through feed-through ports 48. The means disclosed for electrically conducting signals generated by detector 26 to external control electronics (not shown) acts to minimize premature detector fatigue failure.

Tungsten end-cap 32 has a coefficient of expansion substantially similar to that of hybrid detector 26 thereby permitting effective and efficient propagation of thermal energy from detector 26 to end-cap 32 without generating excessive thermal distortion. Alumina mounting board 34 provides a neutral surface upon which detector 26 is mounted and which supplements the distortion resistance provided by tungsten end-cap 32.

While the preferred embodiment illustrates the utilization of the improved low distortion focal plane platform 10 in conjunction with a coldfinger 38, it is contemplated that the present invention is applicable to infrared detector assemblies constructed without a coldfinger tube. As such, the improved focal plane platform, disclosed herein, would supply the requisite mechanical support while providing the highly desirable low thermal distortion characteristics.

Those skilled in the art can appreciate that other advantages can be obtained from the use of this invention and that modifications can be made without departing from the true spirit of the invention after studying the specification, drawings and following claims.

What is claimed is:

1. A detector assembly comprising:
   a dewar housing providing an evacuated cavity;
   a focal plane platform within said evacuated cavity, said focal plane platform having a tungsten end-cap and a ceramic mounting board;
   a detector mounted on said ceramic mounting board;
   means for cooling said focal plane platform and said detector; and
   whereby said focal plane platform inhibits thermal distortion during cooling of said detector while providing thermal conductivity between said cooling means and said detector.

2. A detector assembly according to claim 1 wherein said ceramic mounting board has a substantially planar upper surface, said upper surface providing a low distortion focal plane on which said detector is mounted.

3. A detector assembly according to claim 2 wherein said ceramic mounting board is fabricated from alumina.

4. A detector assembly according to claim 3 wherein said alumina comprises at least about 97% of said ceramic board.

5. A detector assembly according to claim 1 wherein said tungsten end-cap is fabricated from pure tungsten.

6. A detector assembly according to claim 1 wherein said ceramic mounting board is adhesively bonded to said tungsten end-cap with an epoxy adhesive material.

7. A detector assembly according to claim 1 wherein said detector comprises an infrared photodetector array electrically interconnected to an integrated circuit readout board, said integrated circuit readout board generating an electrical output in response to said array.

8. A detector assembly according to claim 7 wherein said integrated circuit readout board of said detector is adhesively bonded to said ceramic mounting board with a silicone, room temperature, vulcanizing adhesive having a relatively low glass transition temperature for minimizing thermal stress.

9. A detector assembly according to claim 8 wherein said ceramic mounting board, further comprises conducting means for electrically conducting said electrical output from said integrated circuit readout board to an outer peripheral area of said mounting board.

10. A detector assembly according to claim 9 wherein said conducting means comprises a plurality of electrically conductive gold traces deposited on said upper surface of said ceramic mounting board.

11. A low distortion coldfinger assembly for use in an electromagnetic detector assembly of the type having an evacuated dewar for cooling a hybrid detector positioned therein, comprising:
    a titanium coldfinger tube, said tube having a cold end;
    a focal plane platform comprising means for supporting said detector within said evacuated dewar, said focal plane platform including a tungsten end-cap having a first surface defining a planar surface and a second surface configured to enclose said titanium coldfinger tube at said cold end, and a ceramic mounting board having a first surface comprising a means for mounting whereon said hybrid detector and a second surface secured to said first surface of said tungsten end-cap; and
    a bond hermetically bonding said tungsten end-cap to said coldfinger tube.

12. A low distortion coldfinger assembly according to claim 11 wherein said ceramic mounting board is at least about 97% alumina, said alumina mounting board providing a low distortion focal plane upon which said detector is mounted.

13. A low distortion coldfinger assembly according to claim 12 wherein said tungsten end-cap is made of commercially pure tungsten.

14. A low distortion coldfinger assembly according to claim 13 wherein said tungsten end-cap and said alumina mounting board are adhesively bonded, said adhesive bond is an epoxy.

15. A low distortion focal plane platform for supporting a detector within an evacuated cavity of a detector assembly, comprising:
    a tungsten end-cap defining a planar upper surface; and
    a ceramic mounting board secured to said upper surface of said tungsten end-cap, a surface of said ceramic mounting board opposite said tungsten end-cap comprising means for supporting said detector within said evacuated cavity.

16. A low distortion focal plane according to claim 15 wherein said alumina mounting board is at least about 97% alumina.

17. A low distortion focal plane according to claim 15 wherein said end-cap is made from substantially pure tungsten.

18. A low distortion focal plane according to claim 15 wherein said ceramic mounting board is adhesively bonded to said tungsten end-cap.

19. A method of making a low distortion focal plane platform for supporting an electromagnetic detector within an evacuated dewar of an electromagnetic detector assembly, said method comprising the steps of:
    providing an end-cap made of tungsten;
    providing a planar ceramic mounting board;
    adhesively bonding said tungsten end-cap to said ceramic mounting board; and
    whereby said tungsten end-cap provides resistance to thermal distortion and increased thermal conductivity, and said ceramic mounting board provides supplemental resistance to thermal distortion.

20. A method according to claim 19 wherein said step of adhesively bonding further comprises providing a layer of epoxy adhesive.

* * * * *